United States Patent [15] 3,703,110

Uozumi et al. [45] Nov. 21, 1972

[54] HYDRAULIC CONTROL SYSTEM FOR AN AUTOMATIC TRANSMISSION

[72] Inventors: Sumio Uozumi; Ichio Sakai; Kiyoshi Ohnuma, all of Toyota, Japan

[73] Assignee: Toyota Jidosha Kogyo Kabushiki Kaisha, Toyota-shi, Japan

[22] Filed: Jan. 26, 1971

[21] Appl. No.: 109,786

[30] Foreign Application Priority Data

Jan. 28, 1970 Japan ........................45/7629

[52] U.S. Cl. ...................................74/868, 74/751 C
[51] Int. Cl. ...........................B60k 21/00, F16h 3/74
[58] Field of Search .................................74/867, 868

[56] References Cited

UNITED STATES PATENTS

| | | | |
|---|---|---|---|
| 2,849,889 | 9/1958 | Ball et al | 74/868 |
| 3,543,611 | 12/1970 | Uozumi et al. | 74/867 |
| 3,572,178 | 3/1971 | Kubo | 74/868 |

*Primary Examiner*—Arthur T. McKeon
*Attorney*—Toren & McGeady

[57] ABSTRACT

A hydraulic control system contains a hydraulic pressure source for producing hydraulic pressure supplied into the hydraulic servo mechanisms of a hydraulic automatic transmission, the hydraulic pressure is conveyed through a conduit system to a manual distributing valve which distributes the hydraulic pressure in accordance with its position in the various ranges "P", "R", "N", "D" and "L", a pressure regulator valve is located in the conduit system for establishing a line pressure by regulating the hydraulic pressure from the hydraulic pressure source, a governor valve in communication with a change-over valve and with a shift valve provides a governor pressure conforming to the vehicle speed, and a throttle valve is located in the conduit system for obtaining a throttle pressure conforming to the engine throttle opening. The shift valve supplies the line pressure to the required servo mechanism by comparing the governor pressure and the throttle pressure, and the change-over valve supplies the throttle pressure to the pressure regulator valve in accordance with the governor pressure. When the manual distributing valve is in the "R" range and the engine throttle opening is extremely small, the line pressure from the manual distributing valve is discharged and controlled in the throttle valve to take out a relatively low throttle pressure. When the throttle opening exceeds a predetermined value, the throttle valve takes out the line pressure from the pressure regulator valve as it is, thus obtaining a constant high throttle pressure. When the manual distributing valve is in the "D" range, the throttle pressure is applied to the pressure regulator valve through the change-over valve. When the throttle pressure is low, the line pressure of the pressure regulator valve is reduced, and when the throttle pressure is high, the line pressure thereof is increased. Furthermore, as the governor pressure is supplied to the change-over valve, the throttle pressure applied to the pressure regulator valve at a vehicle speed below a predetermined value, is shut off by means of the changeover valve, thus obtaining a constant low line pressure. Moreover, when the manual distributing valve is shifted from the "D" to the "L" range, this valve communicates the line pressure with the pressure regulator valve and, therefore, a high line pressure is produced by the pressure regulator valve, having no relationship with the vehicle speed and the engine throttle opening.

5 Claims, 7 Drawing Figures

INVENTORS
SUMIO UOZUMI
ICHIO SAKAI
BY KIYOSHI OHNUMA
Toren and McGeady
ATTORNEYS

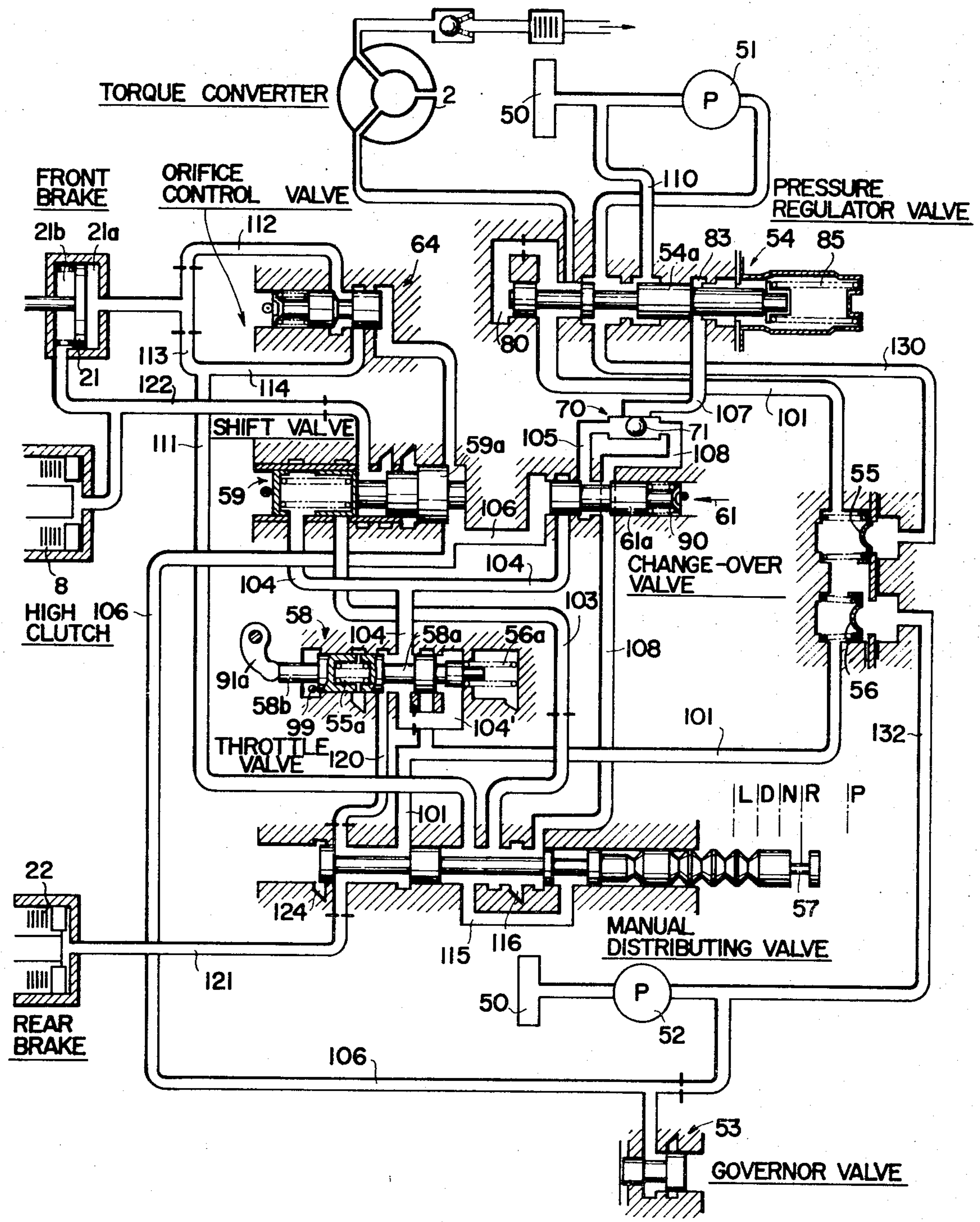
INVENTORS
SUMIO UOZUMI
ICHIO SAKAI
KIYOSHI OHNUMA
BY
Toren and McGeady
ATTORNEYS INVENTORS
SUMIO UOZUMI
ICHIO SAKAI
KIYOSHI OHNUMA
BY Toren and McGeady
ATTORNEYS

HYDRAULIC CONTROL SYSTEM FOR AN AUTOMATIC TRANSMISSION

BACKGROUND OF THE INVENTION

This invention relates to an improvement in the hydraulic control system of a hydraulic automatic transmission for vehicles and more particularly, it relates to a valve capable of performing different control operations depending on the position of a manual distributing valve.

Conventional hydraulic automatic transmissions consist of a torque converter or fluid couplings and an auxiliary multi-stage transmission. The auxiliary multi-stage transmission is designed to convert the power from the torque converter or fluid coupling. It consists of a multi-disc friction clutch, friction brake band, gear transmission, such as a planetary gear unit mechanism, and the like. The multi-disc friction clutch and friction brake band are actuated by hydraulic servo mechanisms. Shifting a change lever, for example, forward first or second speed or reverse speed can be obtained at the output shaft of the gear transmission by selectively operating the multi-disc friction clutch or friction brake band by means of the hydraulic servo mechanisms. This automatic shifting is accomplished by controlling the hydraulic pressure supplied from pumps or the like into the hydraulic servo mechanisms by means of a shift valve. The shift valve is actuated depending on the travelling condition of the vehicle, which is generally accomplished by comparing the throttle pressure Pth conforming to the engine throttle opening, with the governor pressure Pgo conforming to the vehicle speed. In addition to the shift valve, a manual distributing valve is provided for supplying or shutting off the hydraulic pressure from the pumps to the hydraulic servo mechanisms. In the case of a transmission with two forward and one reverse speeds, the manual distributing valve has five ranges; the "P" (parking range), "R" (reverse range), "N" (neutral range), "D" (drive range) and "L" (low range). When the manual distributing valve is in the "R" range, the reverse speed is obtained by means of the transmission and when it is in the "D" or "L" range, the forward speed is obtained. In the "D" range, automatic shifting between the first and second gears is possible by means of the shift valve, however, in the "L" range only the first gear is obtained.

As the force required for actuation of the multi-disc friction clutch or friction brake band varies with the travelling condition of the vehicle, the hydraulic pressure admitted into the hydraulic servo mechanism of the multi-disc clutch or friction brake band (to be referred to as the line pressure PL hereinafter) is changed in accordance with the travelling condition of the vehicle in the "D" range. For example, the line pressure is increased with an increase in the engine throttle opening and is decreased with an increase in the vehicle speed.

However, as is well known, it is desirable that the line pressure PL obtained when the manual distributing valve is in the "R" or "L" range should be higher than that obtained when the manual distributing valve is in the "D" range, because the reduction ratio for the reverse speed or the first speed, is great. Therefore, when the manual distributing valve is in the "R" or "L" range, a constant high hydraulic pressure not changeable with variations in the engine throttle opening or the vehicle speed should be supplied. When the position of the manual distributing valve is to be shifted by means of a shift lever provided at the driver's seat, the engine is idling, and, therefore, engine output torque is very small. Consequently, a large difference develops between the required engaging torque of the friction engaging mechanisms of the clutch or brake band and the engaging torque produced by a high constant hydraulic pressure, and, as a result, shock is developed during shifting.

SUMMARY OF THE INVENTION

This invention is directed to the elimination of the above-described drawbacks. In order to reduce the shock experienced during shifting, the hydraulic pressure should be reduced at the time of shifting the position of the manual distributing valve. Further, the engine throttle opening at the time of shifting is quite small and, with these facts in view, an improvement has been accomplished.

The primary object of the present invention is to provide a valve mechanism whose control operation varies with the position of the manual distributing valve.

Another object of this invention is to afford a valve mechanism in which at least two discharge ports for accomplishing hydraulic control are provided in the valve mechanism, one of the discharge ports being arranged to effect discharge when the manual distributing valve is in a certain range, and to eliminate such discharge when the manual valve is in another range, thereby obtaining different control actions of the valve depending on the position of the manual distributing valve, and also varying the output hydraulic pressure by changing the actuating point of the valve when the manual distributing valve is displaced, thus providing the valve with different control operations.

Yet another object of this invention is to apply the valve mechanism having different control operations to the throttle valve of the hydraulic control circuit of a hydraulic automatic transmission. In other words, the valve mechanism is arranged so that the throttle valve has two discharge ports one of the discharge ports being operative when the manual distributing valve is in a certain range and being placed in communication with an oil passage for introducing the line pressure from a pump when the manual distributing valve is in another range, so that a throttle pressure conforming to the engine throttle opening is obtained for use as an output hydraulic control pressure for the throttle valve when the manual distributing valve is in the certain range, and to obtain a relatively low hydraulic pressure when the manual distributing valve is in another range and the engine throttle opening is extremely small, and, further, to obtain a constant high pressure when the engine throttle opening exceeds a predetermined value.

Still another object of this invention is to obtain the required line pressure PL by controlling the hydraulic pressure discharged by the output control pressure of the throttle valve from the pump by means of a pressure regulator valve. In other words, when the manual distributing valve is in a certain range, the line pressure PL conforming to the throttle opening can be obtained by controlling the pressure regulator valve with the output hydraulic control pressure of the throttle valve. When the manual distributing valve is in another range and the throttle opening is extremely small, a constant low line pressure PL is obtained. Furthermore, when the throttle opening exceeds a predetermined value, a constant high line pressure PL is obtained.

A further object of this invention is to provide a hydraulic control circuit wherein the certain range of the manual distributing valve is the "D" range and another range is the "R" range, thereby softly actuating the friction engaging mechanism by reducing the line pressure PL at the time of extremely small throttle openings when the manual distributing valve is in the "R" range, for reducing shock during shifting from the "N" to the "R" range or from the "P" to the "R" range.

Still a further object of this invention is to obtain a constant low line pressure PL, having no relation to the throttle opening, when the manual distributing valve is in the "D" range and the vehicle speed exceeds a predetermined value, but to obtain a constant high line pressure PL, having no relation with the vehicle speed and throttle opening when said manual distributing valve is in the "L" range.

Other objects and advantages of this invention will be made clear from the following description of preferred embodiments of this invention.

This invention resides in the provision of a hydraulic control system for a hydraulic automatic transmission provided with a fluid torque converter or fluid couplings and a gear unit with hydraulic servo mechanisms, characterized by a hydraulic pressure source for producing hydraulic pressure supplied through a conduit system into the hydraulic servo mechanisms, a manual distributing valve (manual valve) for distributing the hydraulic pressure from the hydraulic pressure source into the required servo mechanism, a throttle valve for introducing the hydraulic pressure from the hydraulic pressure source and developing a throttle pressure conforming to the engine throttle opening, and a pressure regulator valve for controlling the hydraulic pressure supplied from the hydraulic pressure source into the servo mechanisms at a predetermined value by means of the output hydraulic pressure of the throttle valve, the throttle valve having two discharge ports, one of the discharge ports being effective when the manual distributing valve is in a certain range but being placed in communication with an oil passage for introducing the hydraulic pressure from the hydraulic pressure source when the manual distributing valve is in another range for providing different control operations for the throttle valve depending on the position of the manual distributing valve, thereby producing a hydraulic control pressure conforming to the throttle opening by means of the pressure regulator valve utilizing the hydraulic control pressure of the throttle valve when the manual distributing valve is in a certain range, and producing a relatively low hydraulic control pressure when the manual distributing valve is in another range and the throttle opening is nearly fully closed, but affording a relatively high constant hydraulic control pressure when the throttle opening exceeds a predetermined value.

DESCRIPTION OF THE DRAWING

In the accompanying drawing:

FIG. 2 is a circuit diagram of the hydraulic control system in accordance with the present invention;

DESCRIPTION OF THE PREFERRED EMBODIMENTS

The following is a description of an embodiment of a hydraulic control system, in accordance with the present invention, based on the illustrations in the accompanying drawing.

Figure 1:
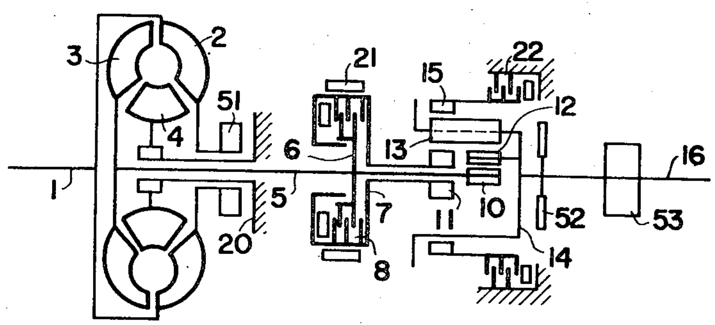
FIG. 1 is a diagrammatic illustration of an automatic transmission embodying a hydraulic control system in accordance with the present invention.

FIG. 1 discloses the construction of a general-purpose transmission to which this invention is applied, for example a hydraulic automatic transmission with two forward and one reverse speeds. In FIG. 1, a pump impeller 2 is directly coupled to an engine crank shaft 1. Engine power is transmitted from the pump impeller 2 to a turbine runner 3 with the aid of a hydraulic fluid, such as oil. The oil is guided by a stator 4 for recirculation into the pump impeller 2. Turning power is continuously developed at a turbine shaft 5 by continuing the flow of oil. The turning force developed is transmitted from the turbine shaft 5 to a gear transmission provided at the rear of a torque converter. Thus, with the use of a planetary gear unit mechanism, a transmission mechanism for two forward and one reverse speeds is obtained by automatically controlling a clutch mechanism 8 and brake mechanisms 21 and 22 by servo hydraulic pressure.

The gear transmission located at the rear of the torque converter includes the turbine runner 3 connected to the turbine shaft 5 which serves as an input shaft for the planetary gear unit mechanism. A hub 6 of the clutch 8 and an input sun gear 10 are positioned on the turbine shaft. A low sun gear 11 is integrally fitted into a clutch drum and a disc 7 thereof which are related with each other through the hub 6 and a plurality of clutch plates. Pinions 12 and 13, which are meshed with each other, are supported on a carrier 14 integral with an output shaft 16 and are meshed with the input sun gear 10, the low sun gear 11 and a ring gear 15, respectively. A brake band 21 is provided at the outer periphery of the clutch drum. The rear brake mechanism 22 is positioned between the outer periphery of the drum of the ring gear and the case body.

Next, gear shifting performance between two forward speeds and one reverse speed is obtained by the above-described construction as follows:

First speed . . . . . The speed from the turbine shaft 5 is reduced by fixing the clutch drum 7 and the low sun gear 11 integral with the drum through the actuation of the front brake band 21. This reduced speed is transmitted to the output shaft 16. Thus, shifting to the first speed is accomplished.

Second speed . . . . . Driving of the output shaft 16 from the turbine shaft 5 is converted to direct driving by forming the planetary gear system into a single unit through the engagement of the high clutch. Thus, shifting to the second speed is accomplished.

Reverse speed . . . . . The rotation of the turbine shaft 5 converted to the rotation of the output shaft 16 at a reduced speed in the reverse direction by stopping the ring gear 15 through the actuation of the rear brake 22. Thus, shifting to the reverse speed is obtained.

Next, the control circuit of line pressure PL supplied to the hydraulic servo mechanisms of the clutch 8 and the brakes 21 and 22 will be described with reference to FIG. 2. In FIG. 2, oil is sucked from oil strainers 50 by means of a front oil pump 51, which is directly driven by the engine through the pump impeller 2, and a rear oil pump 52, which is driven by the output shaft 16. This oil is supplied through check valves 55 and 56 to a line pressure circuit 101 of the transmission conduit system. The hydraulic pressure in the circuit 101 is regulated by means of a pressure regulator valve 54 and is transmitted to a throttle valve 58. In addition, the hydraulic pressure in the circuit 101 is supplied into oil passages 111 and 103 through a manual distributing valve 57 when the valve is in the "D" range. When the valve is in the "L" range, this pressure is supplied into oil passages 111 and 108, and, when the valve is in the "R" range, the pressure is supplied into oil passages 120 and 121. The engine throttle opening is sensed as a plug displacement by means of the throttle valve 58, and a hydraulic pressure proportional to this displacement, i.e., engine throttle opening, is developed in the oil passage 104. This hydraulic pressure is called "throttle pressure P*th*." The throttle valve is characteristic of this invention and is adapted to produce a hydraulic pressure different from the throttle pressure, a description of which is provided at a later part of this specification. The speed of the vehicle is detected by a governor valve 53 which is driven by the output shaft 16, note FIG. 1. A governor pressure proportional to the detected vehicle speed is supplied into an oil passage 106 within the conduit system. The change-over of reduction gear ratio of the planetary gear unit mechanism is accomplished by means of a shift valve 59 which is actuated by the throttle pressure P*th* and governor pressure P*go*. Namely, when the manual distributing valve 57 is in the "D" range, the line pressure PL is also supplied into the oil passage 111 connecting the manual distributing valve 57 to the brake band 21. Therefore, the hydraulic pressure is directed to the servo piston actuating side 21a of the front brake band 21. If the hydraulic pressure is zero in the oil passage 122, the brake band 21 is actuated and the clutch 8 is released, thus accomplishing shifting to the first speed. When a certain vehicle speed conforming to the throttle opening is reached, the shift valve 59 is actuated and moved to the left by means of the governor pressure P*go*, thus establishing communication between the oil passage 103 and the oil passage 122. At this time, the line pressure PL is applied to the clutch 8 and the release side 21*b* of the front servo piston. Consequently, the front brake band 21 is released and the clutch 8 is actuated. Thus, the planetary gear system is rotated as a single unit and the driving from the turbine shaft 5 to the output shaft 16 is converted to the direct driving, thus obtaining the second speed. Down-shifting from the second speed to the first is accomplished by discharging the hydraulic pressure from the oil passage 122 by means of the shift valve 59.

Figure 3:
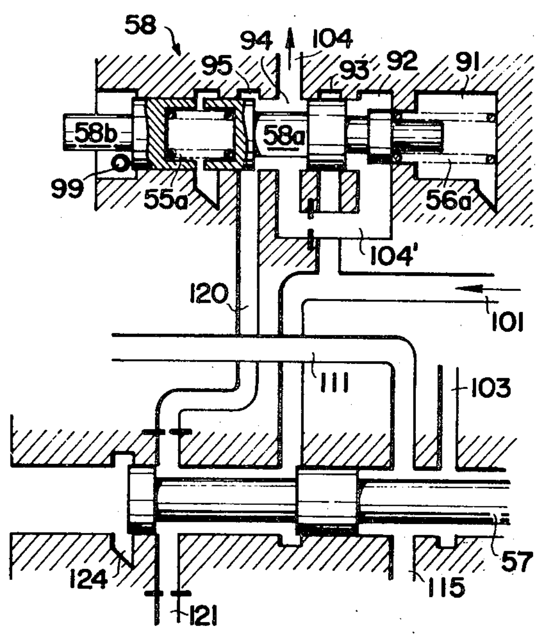
FIG. 3 is a partial enlarged view of the circuit diagram of FIG. 2 exhibiting a throttle valve and a manual distributing valve (manual valve) which are principal circuit elements of the invention.

The circuit structure for the throttle valve 58 and manual distributing valve 57 which are the principal elements of the invention in the hydraulic pressure control circuit are described below with reference to FIG. 3 illustrating the circuit structure in enlarged form. The throttle valve 58 has a valve shaft 58*a* and a valve plug 58*b*. The valve 58 contains five serially arranged oil chambers; the first oil chamber 91, second oil chamber 92, third oil chamber 93, fourth oil chamber 94 and fifth oil chamber 95, when viewed from the right. The third oil chamber 93 is connected to the line pressure circuit 101, from which the line pressure PL is introduced. The second oil chamber 92 and fourth oil chamber 94 are connected by an oil passage 104'. At the same time, the fourth oil chamber 94 is connected to an oil passage 104 leading to a change-over valve 61 and supplies hydraulic control pressure of the throttle valve 58 into the passage 104. The fifth oil chamber 95 is connected to the oil passage 120 which leads to the manual distributing valve 57. When the manual distributing valve 57 is in the "R" range, the line pressure PL is introduced from the circuit 101 into the oil passage 120. When the manual distributing valve 57 is in another range (ranges "P", "N", "D" and "L"), the oil passage 120 is brought into communication with a discharge port 124 of the manual distributing valve 57, and the fifth oil chamber acts as a discharge chamber having a discharge port. Similarly, the first oil chamber 91 always serves as a discharge chamber and has a discharge port. Coil springs 55*a* and 56*a* are positioned within the throttle valve 58, spring 56 *a* is located at the right hand end of the valve shaft 58*a* and spring 55*a* is situated between the valve shaft 58*a* and the plug 58*b*, respectively. Thus, the valve shaft 58*a* is biased at both of its ends by springs 56*a* and 55*a*.

Figure 5:
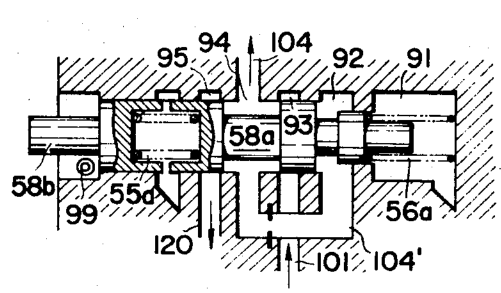

Next, hydraulic pressure control performance of the throttle valve 58 as described above is described. When the manual distributing valve 57 is in the "P", "N". "D" or "L" range, the oil passage 120 communicates with the discharge port 124 of the manual distributing valve 57, and, therefore, the fifth oil chamber 95 of the throttle valve 58 acts as a pressure discharge chamber. When the line pressure PL is supplied from the circuit 101 into the third oil chamber 93 under the above condition, the hydraulic pressure in the second oil chamber 92, and the fourth oil chamber 94, is controlled at the control point of the valve shaft 58*a* shown in FIG. 5 so as to provide a balance with the tension of the springs 56*a* and 55*a* being active on the valve shaft 58*a*. The hydraulic pressure in the second oil chamber 92 and the fourth oil chamber 94 is regulated through the discharge into the fifth oil chamber 95 connected to the discharge port. The plug 58*b* is pushed to the right by means of a cam lever 91*a* in accordance with the increase in the engine throttle opening, thus intensifying the tension of the spring 55*a*. Consequently, the hydraulic pressure developed in the second oil chamber 92 and the fourth oil chamber 94 is gradually controlled to a high pressure. This controlled pressure is obtained as the throttle pressure Pth in the oil passage 104. As mentioned above, the throttle pressure P*th* gradually increases with an increase in the engine throttle opening.

When the manual distributing valve 57 is in the "R" range, the oil passage 120 communicates with the line pressure circuit 101 in the manual distributing valve 57. Thus, the line pressure PL is admitted into the oil passage 120. When the throttle opening is nearly fully closed under the above-mentioned condition, the valve shaft **58*a* is in the control position as shown in FIG. 3. Thus, communication between the fifth oil chamber 95 and the fourth oil chamber 94 is established, and discharge and control of hydraulic pressure is performed between the second oil chamber 92 and the first oil chamber 91. Under this condition, the line pressure PL is supplied from the oil passage 120 into the fourth oil chamber 94 and is discharged from the second oil chamber 92 through the oil passage 104' into the first oil chamber to be controlled so that the hydraulic pressure in the second oil chamber of the valve shaft 58*a* is balanced against the tension of the springs 55*a* and 56*a*. Therefore, the hydraulic pressure in the oil chambers 94 and 95 becomes lower than the line pressure PL as a result of pressure drop due to the flow resistance. The lowered hydraulic pressure is taken out in the oil passage 104. The lowering of hydraulic pressure is continued as long as the engine throttle opening is slightly increased from the fully closed condition and the plug 58*b* is brought into contact with the valve shaft 58*a*, thus enabling the valve shaft 58*a* to forcibly shut off the communication between the second oil chamber 92 and the first oil chamber 91**.

Figure 4:
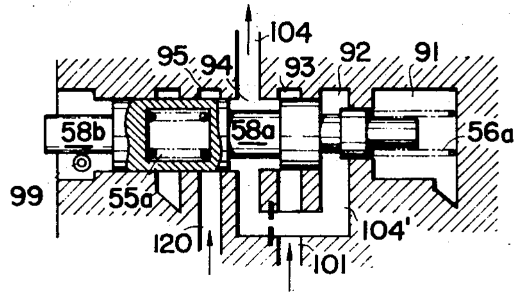
FIGS. 4 and 5 are diagrams illustrating different operational conditions of the throttle valve.

After the communication between the second oil chamber 92 and the first oil chamber 91 is forcibly closed, the line pressure PL is supplied from the circuit 101 as shown in FIG. 4. This line pressure PL is taken out as is in the oil passage 104. In other words, since there is no outlet for the line pressure PL supplied into the second oil chamber 92 after the communication between the second oil chamber 92 and the first oil chamber 91 has been closed, the line pressure PL can be taken out as is. As described above, when the manual distributing valve 57 is in the "R" range, a relatively low hydraulic pressure is taken out if the throttle opening is nearly fully closed, but the line pressure PL is taken out as is if the throttle opening exceeds a predetermined value.

In the above-described embodiment, the line pressure PL is introduced when the manual distributing valve is in the "R" range. If the oil passage 120 is closed, however, the same control as described above can be accomplished. That is, the same operation can be obtained if the discharge of hydraulic pressure in the fifth oil chamber 95 is eliminated.

The line pressure PL to be supplied into the hydraulic servo mechanisms of said clutch and brake mechanisms is controlled by the change-over valve 61 and the pressure regulator valve 54. First, the operation of these valves 61 and 54 in the "D" range is described. The change-over valve 61 is constructed so that the governor pressure P*go* produced in the oil passage 106 to conform with the vehicle speed, is applied to the left end of the valve shaft **61*a*. A coil spring 90 is provided at the right end of the valve shaft 61*a*. The valve shaft 61*a*** is controlled by the governor pressure P*go* and the tension of the coil spring 90 and is moved to the left or the right. Since the tension of the spring 90 is preset at a constant value, the changeover valve 61 is operated in accordance with the change in the governor pressure P*go*. That is, if the revolutional speed of the output shaft 16 is low and the governor pressure P*go* is also low, the valve shaft **61*a* of the change-over valve 61 is moved to the left by the tension of the coil spring 90, thus establishing communication between the oil passage 104 and the oil passage 105. Consequently, the throttle pressure Pth of the oil passage 104 is applied to the pressure regulator valve 54 through the oil passages 105 and 107**. When the governor pressure P*go* is increased with the increase in the revolutional speed of the output shaft 16, the governor pressure P*go* overcomes the tension of the coil spring 90, and moves the valve shaft **61*a* to the right. At this time, communication between said oil passages 104 and 105 is shut off, and conversely communication between the oil passage 105 and the discharge oil passage is established. Thus, the hydraulic pressure in the oil passage 107 is discharged from a discharge port 116 of the manual distributing valve 57 through the oil passages 105 and 108**.

Figure 6:
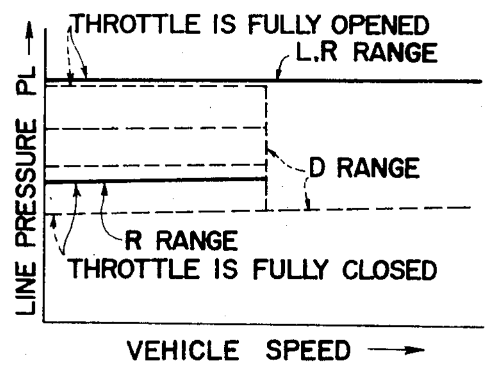
FIG. 6 is a hydraulic pressure characteristic diagram with respect to the vehicle speed.
Figure 7:
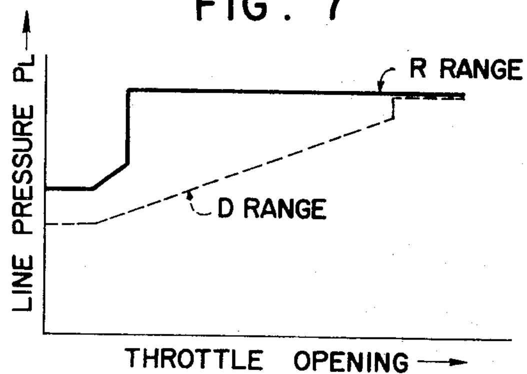
FIG. 7 is a hydraulic pressure characteristic diagram with respect to the engine throttle opening.

Next, the operation of the pressure regulator valve 54 is described. The discharge oil from the oil pumps 51 and 52 is supplied through the circuit 110, 130, 101 and the circuit 132, 101 to an oil chamber 80 at the left-hand end of the valve shaft **54*a*. The right-hand end of the valve shaft 54*a* is loaded by a coil spring 85. An oil chamber 83 is provided at the right of the valve shaft 54*a*, into which the hydraulic pressure from the oil passage 107 is supplied. The valve shaft 54*a* is controlled by the hydraulic pressure applied to the left-hand end chamber 80, the tension of the coil spring 85 at the right-hand end and the pressure applied to the chamber 83. Thus, the valve shaft 54*a* is moved either to the left or to the right. Now, if it is assumed that the manual distributing valve 57** is in the "D" range and the vehicle speed is low, and that the throttle pressure P*th* is supplied into the oil passage 107 under the condition where the valve shaft **61*a* of the change-over valve 61** has been moved to the left, then under these conditions, the throttle pressure P*th* is supplied into the oil chamber 83 of the pressure regulator valve 54 and pushes the valve shaft **54*a* to the left with the aid of the tension of the coil spring 85. Consequently, the oil in the left side oil chamber 80 produces a pressure conforming to the pressure in the right side oil chamber, which is taken out as the line pressure PL in the circuit 101**. If the throttle pressure P*th* is low (when the engine throttle is fully closed), the line pressure PL will also be low. If the throttle pressure Pth is high (when the engine throttle is fully opened), the line pressure PL will be high. This condition corresponds to the condition at low vehicle speeds shown in the hydraulic pressure characteristic diagram of FIG. 6. In FIG. 7, the change in the hydraulic pressure with respect to the engine throttle opening is illustrated in broken line.

When the vehicle speed is increased and the valve shaft **61*a* of the change-over valve 61 is moved to the right, thus effecting communication between the oil passage 105 and the oil passage 108, the hydraulic pressure in the oil chamber 83 of the pressure regulator valve 54 is discharged through the oil passages 107, 105 and 108 in the "D" range. Therefore, the valve shaft 54***a* is operated so as to balance only with the tension of the coil spring 85 to be applied to the right-hand end of the valve 54*a*. The hydraulic pressure in the oil chamber 80 is always regulated at a constant low pressure, bearing no relation with the throttle pressure P*th*. This pressure is supplied as the line pressure PL by the circuit 101. This condition corresponds to the condition at high vehicle speeds shown in the hydraulic pressure characteristic diagram of FIG. 6.

The above-described condition is a favorable condition for obtaining the line pressure PL under the normal travelling condition where the manual distributing valve is in the "D" range. If the operation of the engine brake is required when the vehicle is running at a intermediate speed with the manual distributing valve placed in the "D" range, the engine brake for the first gear is immediately obtained by shifting the manual distributing valve 57 into the "L" range. Under this condition, however, the engine throttle is usually in the fully closed condition. If the line pressure is controlled samely as in the "D" range, the line pressure PL for actuating the brake band 21 is relatively low as shown in broken line in FIG. 6 and is not sufficient for the actuation of the engine brake. Therefore when the manual distributing valve 57 is placed in the "L" position, it is desirable to obtain a constant high line pressure PL, having no relation with the vehicle speed, such as a hydraulic control pressure as shown in full line in FIG. 6.

In order to attain the above-mentioned objective, in this embodiment, the oil passage 108 of the pressure regulator valve 54 is connected to the manual distributing valve 57 so that, with the manual distributing valve 57 in the "L" range, communication between the oil passage 108 and a circuit 115 supplied with the line pressure PL can be established and this communication can be shut off so as to discharge the hydraulic pressure of the oil passage 108 from the oil passage 116 into the oil pan when the manual distributing valve 57 is in the "D" range. When the manual distributing valve is in the "L" range, the line pressure PL is supplied into the right side oil chamber 83 of the pressure regulator valve 54 through the oil passages 115, 108, and 107. Therefore, the valve shaft 54*a* of the pressure regulator valve 54 is always pushed in a left-hand direction by means of the pressure supplied into the oil chamber 83 and the tension of the coil spring 85, thus maintaining the hydraulic pressure in the left side oil chamber 80 at a constant high pressure conforming to that in the right side oil chamber 83. This high pressure is taken out as the line pressure PL in the circuit 101. This line pressure PL is obtained, having no relation with the vehicle speed, and, therefore, the line pressure PL as shown in continuous line in FIG. 6 is obtained. Since a high line pressure PL is obtained as described above when the manual distributing valve is in the "L" position, this system can operate satisfactorily even when the engine brake is applied.

A check ball mechanism 70 is provided between the oil passage 107 and the oil passages 105 and 108. This check ball mechanism 70 is provided with a check ball 71. The ball 71 is shifted to the right to close the oil passage 108 when the throttle pressure P*th* is supplied from the oil passage 105 into the oil passage 107, and is shifted to the left to close the oil passage 105 when the line pressure PL is supplied from the oil passage 108 into the oil passage 107.

The description of the hydraulic pressure control operation when the manual distributing valve is in the "R" range follows, which relates to one of the principal objects of the invention. When the manual distributing valve is in the "R" range, the hydraulic pressure produced by the throttle valve 58 is relatively low, as described above, if the throttle opening is nearly fully closed. When the throttle opening exceeds a predetermined value, the hydraulic pressure is the same as the line pressure PL. When the manual distributing valve is in the "R" range, the valve shaft 61*a* of the change-over valve 61 is always pushed in a left-hand direction by means of the coil spring 90 because there is no governor pressure P*go* in the oil passage 106, and therefore, the hydraulic pressure is applied from the oil passage 104 through the oil passages 105 and 107 to the right side oil chamber 83 of the pressure regulator valve 54. When the throttle opening is nearly fully closed, a relatively low hydraulic pressure is supplied into the oil chamber 83, as indicated above. Thus, a hydraulic pressure conforming to the above-mentioned hydraulic pressure plus the tension of the spring 85 is produced in the left side oil chamber 80. This hydraulic pressure is taken out as the line pressure PL in the circuit 101. The line pressure PL under this condition is higher than the lowest line pressure PL at the time when the manual distributing valve is in the "D" range, but is lower than that at the time when the throttle opening is fully opened, because the hydraulic pressure to the oil chamber 83 is lower than the line pressure PL. The line pressure PL under this condition corresponds to the condition at relatively lower engine throttle openings shown in full line in the hydraulic pressure characteristic diagram of FIG. 7.

After the engine throttle opening exceeds a predetermined value, the line pressure PL is supplied into the oil chamber 83, and, therefore, the same control is achieved as in the condition where the manual distributing valve is in the "L" range. The line pressure PL obtained will be the same constant high pressure as is obtained at the time when the manual distributing valve is in the "L" range. In the hydraulic pressure characteristic diagram of FIG. 7, the condition at relatively high throttle openings shown in full line indicates the control line pressure. When the manual distributing valve is in the "R" range, the line pressure is low if the throttle opening is nearly fully closed. A constant high line pressure is obtained, however, when the throttle opening exceeds a predetermined value.

According to this invention, the line pressure as described above is obtained when the manual distributing valve is in the "R" range, and, therefore, the line pressure PL is low when the manual distributing valve is shifted from the "Neutral" to the "Reverse" range or from the "Parking" to the "Reverse" range, because the engine throttle is nearly closed. Consequently, engaging torque of a friction engaging mechanism will be small and shock due to shifting can be reduced. After the manual distributing valve has been shifted, the line pressure PL is suddenly increased in a quick response to the engine throttle opening, thus fully satisfying the required braking torque of the friction engaging mechanism.

Moreover, this invention permits hydraulic pressure regulation with two different characteristics by a single valve such as the above-described throttle valve depending on the engine throttle opening. It is also possible to change the automatic shifting pattern at a predetermined position of the manual distributing valve by utilizing these characteristics. Thus, an automatic shifting pattern conforming to the loaded condition of a vehicle can be selected by shifting the manual distributing valve.

While this invention has been described with reference to an example where an embodiment of this invention has been applied to a hydraulic automatic transmission for two forward speeds and one reverse speed, it will be understood that various changes and modifications may be made without departing from the principles of the invention as will be readily apparent to those skilled in the art.

We claim:

1. In a hydraulic automatic transmission connected to an engine and provided with fluid coupling means and a gear unit including hydraulic servo mechanisms, a hydraulic control system for the hydraulic automatic transmission comprising a conduit system for circulating pressurized hydraulic fluid, a hydraulic pressure source for producing hydraulic pressure being supplied through said conduit system into said hydraulic servo mechanisms, a manual distributing valve displaceable within a number of ranges and positioned within said conduit system for distributing the hydraulic pressure from said hydraulic pressure source to the required said servo mechanism, and a valve positioned within said conduit system for introducing the hydraulic pressure from said hydraulic pressure source and developing a suitable hydraulic control pressure, said valve having at least two discharge ports from separate spaced locations therein for accomplishing hydraulic pressure control, one of said discharge ports being disposed with respect to said manual distributing valve for permitting discharge when said manual valve is in a certain range, but for eliminating discharge when said manual valve is in another range, thus providing two different control operations for said valve depending on the position of said manual distributing valve and permitting a change in the output hydraulic pressure by changing the actuating point of said valve when said manual distributing valve is in another range.

2. In a hydraulic automatic transmission connected to an engine and provided with fluid coupling means and a gear unit including hydraulic servo mechanisms, a hydraulic control system for the hydraulic automatic transmission comprising a conduit system for circulating a pressurized hydraulic fluid and including a line pressure circuit, a hydraulic pressure source for producing hydraulic pressure being supplied through said conduit system into said hydraulic servo mechanisms, a manual distributing valve displaceable within a plurality of ranges and positioned in said conduit system and connected to said line pressure conduit for receiving the hydraulic pressure from said hydraulic pressure source and being arranged to distribute the hydraulic pressure through the required said servo mechanism, a throttle valve positioned in said conduit system and connected to said line pressure circuit for receiving the hydraulic pressure from said hydraulic pressure source and being arranged to develop a throttle pressure conforming to the engine throttle opening, a pressure regulator valve positioned in said conduit system and located upstream in said line pressure circuit from said throttle valve and distributing valve, said conduit system including a conduit section connecting said pressure regulator valve and said throttle valve for controlling the hydraulic pressure to be supplied from said hydraulic pressure source into said servo mechanisms at a predetermined value by means of the output hydraulic pressure of said throttle valve, said throttle valve having a plurality of serially arranged hydraulic fluid chambers therein with a discharge port from each of the opposite end fluid chambers, one of said discharge ports being arranged so as to effect discharge when said manual distributing valve is in a certain range and to be brought into communication with a part of said conduit system for introducing the hydraulic pressure from said hydraulic pressure source when said manual distributing valve is displaced into another range, thereby providing different control operations for said throttle valve depending on the position of said manual distributing valve, thus producing a hydraulic control pressure conforming to the throttle opening by means of said pressure regulator valve utilizIng the hydraulic control pressure of said throttle valve when said manual distributing valve is in the certain range, and producing a relatively low hydraulic control pressure when said manual distributing valve is in another range and the throttle opening is nearly fully closed, but a relatively high constant hydraulic control pressure when the throttle opening exceeds a predetermined value.

3. In a hydraulic automatic transmission, as set forth in claim 2, characterized in that said throttle valve contains five serially arranged oil chambers therein, and one of said oil chambers having a discharge port therefrom.

4. In a hydraulic automatic transmission, as set forth in claim 2, characterized in that said throttle valve comprises a valve housing, a valve plug disposed within one end of said housing, a valve shaft movably displaceable within said valve housing and arranged in alignment with said valve plug, and a pair of springs disposed within said housing and each said spring being biased against an opposite end of said valve shaft.

5. In a hydraulic automatic transmission, as set forth in claim 2, characterized in that a change-over valve being positioned within said conduit system between said throttle valve and said pressure regulator valve, said change-over valve having a spring biased valve shaft therein, and a governor valve driven by the output shaft of said transmission and in communication through said conduit system with the said change-over valve for determining the position of said spring biased value shaft therein.

* * * * *